United States Patent

Salomon et al.

[11] Patent Number: 6,076,096
[45] Date of Patent: Jun. 13, 2000

[54] BINARY RATE MULTIPLIER

[75] Inventors: Eyal Salomon, Rishon Le Zion; Yoram Salant, Rosh Haain; Oded Norman, Pardesia; Vladimir Koifman, Ramat Gan, all of Israel

[73] Assignee: Motorola Inc., Schaumburg, Ill.

[21] Appl. No.: 09/006,212

[22] Filed: Jan. 13, 1998

[51] Int. Cl.⁷ .................................................. G06F 7/68
[52] U.S. Cl. ........................................ 708/103; 377/49
[58] Field of Search .............. 708/103; 377/48, 377/49

[56] References Cited

U.S. PATENT DOCUMENTS

| | | | |
|---|---|---|---|
| 3,764,784 | 10/1973 | Haner et al. | 235/150.3 |
| 3,826,901 | 7/1974 | Band et al. | 235/150.3 |
| 4,193,037 | 3/1980 | Kyu | 328/46 |
| 4,891,825 | 1/1990 | Hansen | 377/52 |
| 4,935,944 | 6/1990 | Everett | 327/48 |
| 4,991,188 | 2/1991 | Perkins | 377/49 |
| 5,088,057 | 2/1992 | Amrany et al. | 708/103 |
| 5,131,015 | 7/1992 | Benjaram et al. | 375/121 |
| 5,384,816 | 1/1995 | Prysby et al. | 377/48 |
| 5,473,553 | 12/1995 | Thierry | 708/103 |
| 5,502,751 | 3/1996 | Killian | 375/376 |
| 5,633,814 | 5/1997 | Palaniswami | 708/103 |
| 5,907,590 | 5/1999 | Mogi | 377/48 |

*Primary Examiner*—David H. Malzahn
*Attorney, Agent, or Firm*—Lothar Pfeifer

[57] ABSTRACT

A rate multiplier for rate multiplying a pulse train comprising: an accumulator, a multiplexer for selecting one of a first and a second number of different signs to feed to the accumulator, and a pulse train gate for providing or blocking the pulse train, wherein the multiplexer and the pulse train gate are controlled by the MSB output signal of the accumulator.

8 Claims, 2 Drawing Sheets

-PRIOR ART-

-PRIOR ART-

BINARY RATE MULTIPLIER

FIELD OF THE INVENTION

The present invention relates to binary rate multipliers and, more particularly, to rate multipliers providing pulse trains with uniformly distributed distortions.

BACKGROUND OF THE INVENTION

Binary rate multipliers for multiplying a train of pulses by a selectable calibration factor between zero and unity are well known. Such rate multipliers are used in many systems, mainly in various types of communication systems, where there is a need to create a new system frequency clock from a given higher-frequency clock. For example, one can derive the commercial standard clock frequency of 16.384 MHz from the cellular standard clock frequency of 16.8 MHz by multiplying the latter with the factor 512/525. The resulting frequency can be used for voice sampling at 8.0 kHz. Rate multipliers are also used in measurement devices such as a tachometer to transform a pulse train representing actual hardware units into engineering units such as meters or feet. Here, we will use clock frequencies for simplicity of explanation.

Prior art rate multipliers usually employ several counters which are combined in a specific way to provide the multiplication of the input pulse train. The single pulses of the result pulse train are like the single pulses of the input pulse train but some full or half cycles are missing per time unit according to the given multiplication factor. The ratio of the result frequency B and the input frequency A can be represented as a whole fraction number $$\frac{B}{A} = \frac{z}{y} = \frac{y-x}{y}, \quad (1)$$

where x, y, z are whole numbers representing cycles, and x is the number of cycles to be eliminated during y input cycles.

A prior art solution is to translate this ratio into a polynomial of simple fractions and use basic mathematical operators (like addition, subtraction and multiplication). This polynomial is implemented by a small number of counters which give as a result the primary ratio. As a numerical example it is assumed that a system clock CLK_SYS of frequency B=16.384 MHz is wanted and a source clock CLK_IN of frequency A=16.8 MHz is provided, which gives a frequency ratio of z/y=512/525, and x=13. The polynomial which represents this fraction can be written as:

$$512/525 = (525-13)/525 = 1 - (\tfrac{1}{3}5^*(1-(\tfrac{1}{5}^*(1-\tfrac{1}{3})))). \quad (2)$$

FIG. 1 shows prior art binary rate multiplier 10 requiring three counters (:35-counter, :5-counter and :3-counter) 12, 14, 16 and three subtractors 18, 20, 22. Source clock CLK_IN 24 of frequency A=16.8 MHz is submitted to subtractor 18 and counter 12, which is a divided by 35-counter, i.e. for every thirty-five cycles at its input 26 it provides one cycle at its output 28, which means a total output of fifteen cycles every 525 input cycles. This :35-counter output signal is submitted to subtractor 20 and counter 14, which is a divided by 5-counter, i.e. for every five cycles at its input it provides one cycle at its output, which means a total output of three cycles every 525 input cycles. This :5-counter output signal is submitted to pulse train input 32 of subtractor 22 and counter 16, which is a divided by 3-counter, i.e. for every three cycles at its input it provides one cycle at its output, which means a total output of one cycle every 525 input cycles. The output signal of counter 16 is fed to subtraction input 30 of subtractor 22.

Subtractors 18, 20, 22 each have a pulse train input, a subtraction input and an output, and work as follows. A pulse on the pulse train input is submitted to the output if no pulse appears on the subtraction input, and is not submitted to the output if a pulse appears on the subtraction input. Assuming generally a logic that counts "one"-phases as pulses, source clock CLK_IN 24 and all derived/divided signals consist of pulses that have "one"-phases of about the same length. Then, on every pulse at the subtraction input one pulse is "subtracted" from the output pulse train. Therefore, subtractor 22 outputs two cycles every 525 source clock cycles; subtractor 20 outputs thirteen cycles every 525 source clock cycles, and subtractor 18 outputs 512 cycles every 525 source clock cycles at rate multiplier-output 34. Thus, the source clock frequency CLK_IN is divided by 512/525 and a system clock signal CLK_SYS of the divided frequency is provided.

The resulting pulse trains of rate multipliers can be seen as consisting of source clock cycles and missing cycles, here called distortions. FIG. 2 shows a typical binary rate multiplier timing diagram. Source clock CLK_IN provides continuous pulse train 36 that consists of symmetric pulses 38. Divided system clock signal CLK_SYS 39 consists of symmetric pulses 40 and missing cycles 42, thirteen cycles are missing every 525 source clock cycles.

Often, these missing cycles are not uniformly distributed in the pulse train. Often, the multiplication factor is fixed and a change in this factor makes it necessary to re-design a new binary rate multiplier.

There is a need for simple, economical rate multipliers; for rate multipliers that provide pulse trains with uniformly distributed distortions; and for rate multipliers that allow an easy change of the multiplication factor.

DETAILED DESCRIPTION OF THE PREFERRED EMBODIMENT

It is an advantage of this invention to provide a simple, economical rate multiplier that employs only one accumulator. It is a further advantage of this invention to provide a rate multiplier that provides pulse trains with uniformly distributed distortions. It is another advantage of this invention to provide a rate multiplier that enables one to change the system clock frequency versus the input clock frequency by programming binary rate multiplier registers without the need to create a new design.

Figure 1:
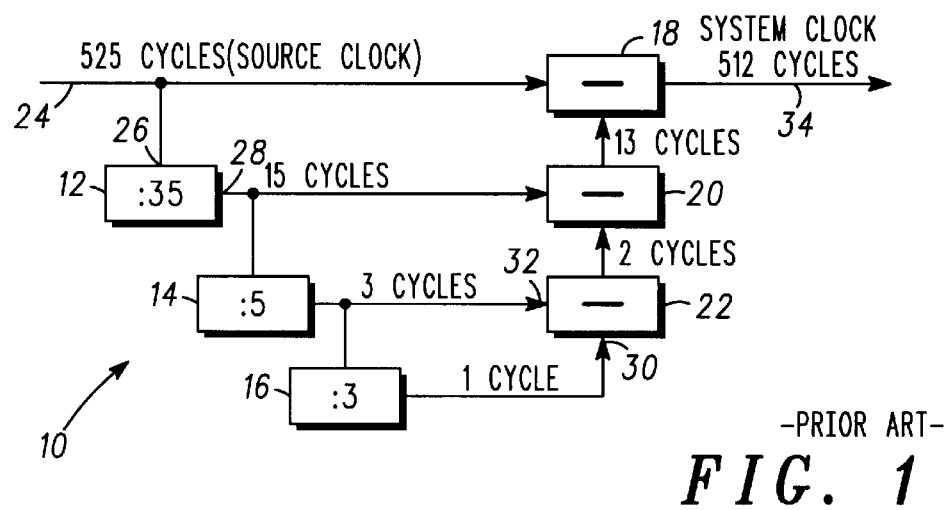
FIG. 1 is a simplified schematic diagram of a binary rate multiplier according to the prior art.
Figure 2:
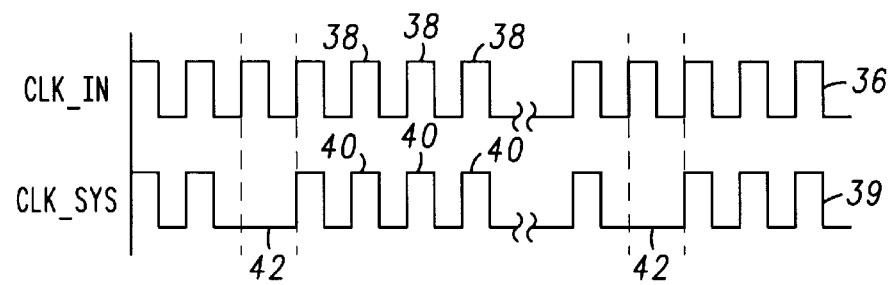
FIG. 2 is a binary rate multiplier timing diagram according to the prior art.
Figure 3:
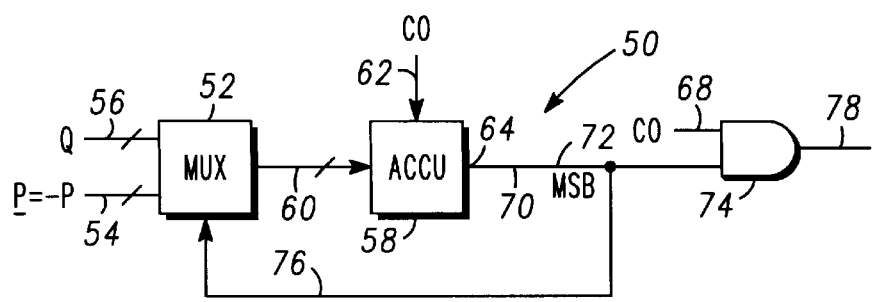
FIG. 3 is a simplified schematic diagram of a rate multiplier according to the present invention.

FIG. 3 shows a simplified schematic diagram of rate multiplier 50 according to the present invention. Rate multiplier 50 for rate multiplying an input pulse train comprises multiplexer MUX 52 for selecting one of first number 54 and second number 56 to feed to accumulator ACCU 58 via line 60. Accumulator 58 is clocked by input clock C0 via clock line 62 such that one value is accumulated per clock pulse. Most significant bit (MSB) 70 of output 64 of accumulator 58 is submitted via gate control line 72 to pulse train gate 74 for passing or blocking the input pulse train of clock C0 on clock line 68. Pulse train gate 74 is shown as a simple AND gate but it can be also a NAND gate or any other gate with appropriate changes in logic levels. MSB 70 of accumulator 58 output is also submitted via mux control line 76 to multiplexer MUX 52. Pulse train gate 74 outputs the generated system clock at rate multiplier output 78.

Programmable binary rate multiplier 50 uses accumulator 58 for forwards and backwards counting. Accumulator 58 accumulates given positive and negative values, and the MSB of accumulator 58 output 64 is used as a control bit. This control bit controls multiplexer 52 to select between input values of opposite sign, i.e. it controls the direction of the counting of the accumulator. Also, the control bit controls the gating of the input clock pulses.

The principle of programmable binary rate multiplier 50 is that it has an accumulator that adds in a full turn of P+Q cycles for a total of P cycles the number Q upward and for a total of Q cycles the number P=−P downward to reach the starting value. On every upward accumulation, one clock cycle is eliminated and on every downward accumulation one clock cycle is passed to the output. In one full turn of P+Q cycles the upward (positive numbers, cycle elimination) and downward (negative numbers, cycle passing) accumulations are as evenly distributed as possible.

In this example positive logic is assumed. Referring to the above formula (1) the first and second numbers P and Q, respectively, are introduced:

$$\frac{B}{A} = \frac{z}{y} = \frac{y-x}{y} = \frac{(Q+P)-P}{(Q+P)} = \frac{Q}{Q+P}. \quad (3)$$

We assume for the purpose of explanation, that B=16.384 MHz, A=16.8 MHz, z/y=512/525, y=525 and x=13, which results in the first number P=−P=−x=−13 and the second number Q=y−P=512. P=x is the number of cycles removed within a full turn of y cycles. Thus, in one full turn of y=525 input clock pulses the accumulator assumes all y=525 values between P=−13 and m=525−13−1=511. Note that if the accumulator assumes zero (positive sign assumed), P=−13 will be added and then the accumulator assumes its minimal value −13. Then, Q=512 will be added and the accumulator assumes the value 511−13=498. If the accumulator assumes −1, Q=512 will be added and the accumulator assumes its maximal value of m=511.

In one full turn of y=525 input clock pulses the accumulator assumes all thirteen values between −1 and −13. Each time the control bit is negative for one input clock pulse, this closes pulse train gate 74 for one pulse. Thus, in one full turn of y=525 input clock pulses, x=13 pulses are eliminated in the generated system clock output by pulse train gate 74. The clocked operation of accumulator 58 provides correct timing of the control signal, i.e. MSB 70, at pulse train gate 74 in relation to the input clock pulses.

Those of skill in the art will understand based on the description herein that the invention can be implemented in various ways. For example, negative logic can be used such that the signs of P, Q and the control bit, i.e. MSB of the accumulator output are inverted, and the control bit is given to an OR or NOR gate, wherein the output pulse train is phase-shifted to the input pulse train. Those of skill in the art will also understand based on the description herein that the counting can happen between other minimum and maximum numbers, in which case the control bit can be computed by a logic or a comparator, assuring that x out of y pulses are eliminated. Using the MSB of the accumulator/adder output is the preferred embodiment because of simplicity.

Figure 4:
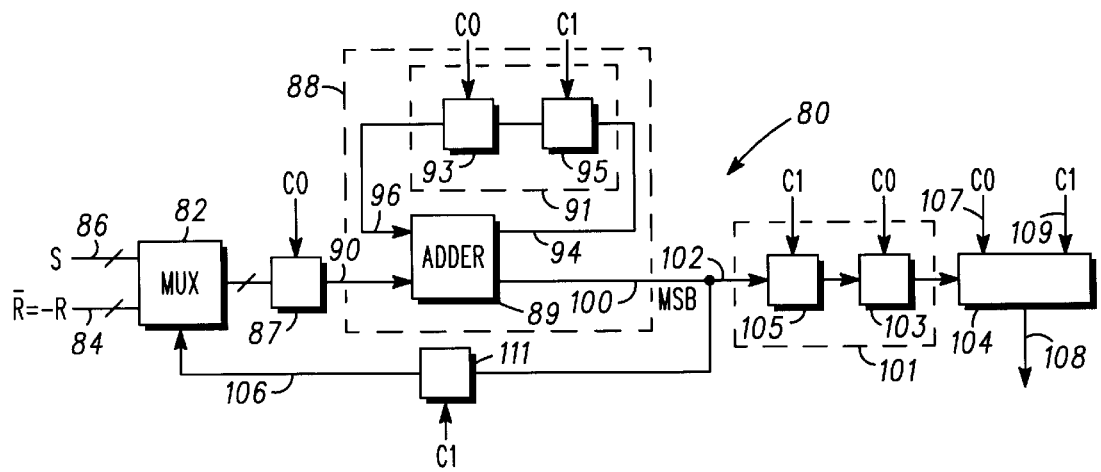
FIG. 4 is a simplified schematic diagram of a rate multiplier according to another embodiment of the present invention.

FIG. 4 is a simplified schematic diagram of rate multiplier 80 according to another embodiment of the present invention. This embodiment employs an adder and latches to provide correct timing of all involved signals and uses two non-overlapping clocks to provide an output pulse train with equally distributed missing half cycles or equally distributed 180° C. phase shifts.

Rate multiplier 80 for rate multiplying an input pulse train comprises multiplexer MUX 82 for selecting one of a first number 84 and a second number 86 to feed to accumulator 88 via latch 87 in line 90. Accumulator 88 comprises adder ADDER 89 which changes its output immediately after a change of one of its inputs. Rate multiplier 80 is clocked by input clocks C0 and C1, which are non-overlapping, i.e. C1 is phase-inverted to C0 and can easily be derived therefrom. Output 94 of adder 89 is fed back to its input 96 via latch group 91 of latches 93, 95, which are clocked by clocks C0 and C1, respectively. Latch group 91 of latches 93, 95 works as a master-slave latch controlled by the two non-overlapping clocks for feeding back the adder output delayed to adder 89. MSB 100 of adder 89 output is submitted via gate control line 102 to latch group 101 of one-bit latches 103, 105, which are clocked by input clocks C0 and C1, respectively, and subsequently to pulse train gate 104. Latch group 101 of latches 103, 105 works as a master-slave latch controlled by the two non-overlapping clocks for feeding the control signal with defined timing to pulse train gate 104. Pulse train gate 104 comprises logic that switches between input clocks C0 and C1, which enter pulse train gate 104 at gate inputs 107 and 109, respectively. MSB 100 of the adder output is also submitted via one-bit latch 111 in mux control line 106 to multiplexer 82. Pulse train gate 104 outputs the generated system clock at rate multiplier output 108. Latch 111 is clocked by clock C0 and latch 87 is clocked by clock C1.

Programmable binary rate multiplier 80 uses adder 89 as an accumulator. The adder result is re-entered with delay as one of the inputs of adder 89. The delay is defined by latch group 91 with the clocking as shown in FIG. 4. Accumulator 88 accumulates given positive and negative values, and the most significant bit (MSB) of accumulator 88 output is used as a control bit. This control bit controls multiplexer 82 to select between input values of opposite sign, i.e. it controls the direction of the counting of the accumulator. Also, the control bit controls the switching between the input clocks C0 and C1 in pulse train gate 104. The system of clocked latches 87, 93, 95, 103, 105, and 111 provides the correct timing of the involved signals, namely that a) accumulator 88 performs one accumulation per input clock cycle; b) multiplexer 82 passes, in every input clock cycle, the correct value to accumulator 88; and c) the switching between the input clocks or phase elimination is performed smoother, i.e. without any voltage spikes.

The principle of programmable binary rate multiplier 80 is that it has an accumulator that adds in a full turn of S+R/2 cycles for a total of R cycles the number S upward and for a total of S cycles the number R=−R downward to reach the starting value. On every upward accumulation one half clock cycle (=one phase) is eliminated and on every downward accumulation one clock cycle is passed to the output.

In one full turn of S+R/2 cycles the upward (positive numbers, cycle elimination) and downward (negative numbers, cycle passing) accumulations are as evenly distributed as possible.

In this example, positive logic is assumed. Referring to the above formula (1), the first and second numbers $\underline{R}$ and S, respectively, are introduced:

$$\frac{B}{A} = \frac{z}{y} = \frac{y-x}{y} = \frac{(S+R/2)-R/2}{(S+R/2)} = \frac{S}{S+R/2}. \quad (4)$$

where R is the number of phases to be eliminated during y input cycles. We assume again for convenience of explanation that B=16.384 MHz, A=16.8 MHz, z/y=512/525, y=525 and x=13, which results in the first number $\underline{R}$=−R=−2x=−26 and the second number S=y−R=499. Thus, in one full turn of y=525 input clock pulses the accumulator assumes all y=525 values between $\underline{R}$=−26 and m=525−26−1=498. Note that if the accumulator assumes zero (positive sign assumed), $\underline{R}$=−26 will be added and then the accumulator assumes its minimal value −26. Then, S=499 will be added and the accumulator assumes the value 511−26=473. If the accumulator assumes −1, S=499 will be added and the accumulator assumes its maximal value of m=498.

Thus, rate multiplier 80 for rate multiplying an input pulse train, comprises multiplexer 82 for selecting one of first number $\underline{R}$ and second number S to feed to accumulator 88, and pulse train gate 104 as a clock switch for selecting one of a first and second non-overlapping input clocks C0, C1, to define a generated system clock. MSB 100 of the accumulator output is coupled to control multiplexer 82 and to control pulse train gate 104, such that in a first state of MSB 100 first number $\underline{R}$ is passed to accumulator 88 and the clock switch keeps selecting the actual selected clock, and in a second state of MSB 100 second number S is passed to accumulator 88 and the clock switch switches to select the other non-overlapping clock to define the generated system clock.

In one full turn of y=525 input clock pulses, the accumulator assumes all twenty-six values between −1 and −26, and each time the control bit is negative for one input clock pulse, and pulse train gate 104 switches between input clocks C0 and C1. Thus, in one full turn of y=525 input clock pulses R=26 phases or x=13 cycles are eliminated in the generated system clock output by pulse train gate 104. The clocked operation of latches 87, 93, 95, 103, 105, and 111 provides correct timing of the control signal, i.e. MSB 100, at pulse train gate 104 in relation to the input clock pulses.

Figure 5:
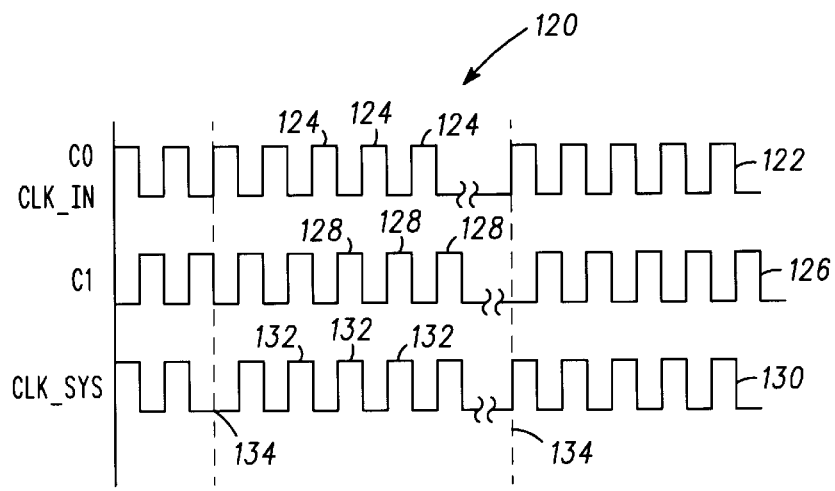
FIG. 5 is a rate multiplier timing diagram according to the rate multiplier of FIG. 4.

FIG. 5 shows timing diagram 120 of a binary rate multiplier according to the invention. Input clock CLK_IN defines first input clock C0 providing continuous pulse train 122 that consists of symmetric pulses 124. Derived therefrom is second input clock C1 providing continuous pulse train 126 that consists of symmetric pulses 128. First clock C0 and second clock C1 are non-overlapping. Divided system clock signal CLK_SYS 130 consists of symmetric pulses 132 and missing phases, i.e. half-cycles, 134; twenty-six phases are missing every 525 input clock cycles. Thus, these missing phases are uniformly distributed in the output pulse train.

Binary rate multipliers according to the invention allow an easy change in the multiplication factor simply by providing different values of $\underline{R}$ and S in accordance with equations (3) and (4), even during an application, without the need to create a new design.

Those of skill in the art will understand based on the description herein that negative logic can also be used such that the signs of $\underline{R}$, S and the control bit, i.e. MSB of the accumulator/adder output, are inverted, and the control bit is given to an appropriate logic gate. Those of skill in the art will know that the counting can also happen between other minimum and maximum numbers, in which case the control bit can be computed by a logic or a comparator, assuring that x out of y pulses are eliminated. Using the MSB of the accumulator/adder output is the preferred embodiment because of simplicity.

Binary rate multipliers 50, 80 are conveniently used to perform a method for rate-multiplying an input pulse train using an accumulator, e.g. 58, 88 controlling a pulse train gate, e.g. 74, 104. The method comprises the steps of:

toggling the gate to (i) pass a pulse of the input pulse train to the output pulse train when the accumulator clocked by the input pulse train has its output in a first state and (ii) block a pulse of the input pulse train to the output pulse train when the accumulator has its output in a second state, wherein the output state of the accumulator is determined by signals received from a multiplexer controlled by the output of the accumulator.

Advantageously, the output state of the accumulator is evaluated by comparing the accumulation result of the accumulator to a threshold number. Preferably, this threshold number is zero and the output state of the accumulator is evaluated by the sign of the accumulation result of the accumulator.

Advantageously, the signals received from the multiplexer are a first number $\underline{P}$ when the accumulator has its output in the first state or a second number Q having a sign opposite to the sign of the first number $\underline{P}$ when the accumulator has its output in the second state. The multiplier rate can vary and the first number and the second number can be determined accordingly.

Advantageously, the input pulse train is selected by the gate to be one of a first or a second pulse trains of different phase. Then, one phase is eliminated from the input train. Preferably the input pulse train is selected and unselected during a low phase. This omits spiking.

In the foregoing detailed description of the preferred embodiment, reference is made to the accompanying drawings which form a part hereof, and in which are shown by way of illustration specific embodiments in which the invention can be practiced. These embodiments have been described in sufficient detail to enable those skilled in the art to practice the invention, and it is to be understood that other embodiments can be utilized and that logical, mechanical and electrical changes can be made without departing from the spirit and scope of the present invention. The foregoing detailed description is, therefore, not to be taken in a limiting sense, and the scope of the present inventions is defined only by the appended claims.

What is claimed is:

1. A rate multiplier for rate multiplying a pulse train, comprising an accumulator providing an accumulator output having an MSB, a multiplexer for selecting one of a first and a second number to feed to the accumulator, and a clock switch for selecting one of a first and second non-overlapping clocks to define a generated system clock, wherein the MSB of the accumulator output is coupled to control the multiplexer and to control the clock switch, such that in a first state of the MSB a first number is passed to the accumulator and the clock switch keeps selecting the actual selected clock, and in a second state of the MSB a second number is passed to the accumulator and the clock switch switches to select the other non-overlapping clock to define the generated system clock.

2. The rate multiplier of claim 1, wherein the accumulator comprises an adder and a master-slave latch controlled by the two non-overlapping clocks for feeding back the adder output delayed to the adder.

3. The rate multiplier of claim 1, wherein the multiplier comprises a master-slave latch for the MSB of the accumulator output, the latch being controlled by the two non-overlapping clocks.

4. The rate multiplier of claim 1, wherein the multiplier rate equals the ratio z/y of whole numbers z, y, the first number fulfilling $|\underline{R}|=|2*(z-y)|$, and the second number fulfilling $|S|=||y|-|\underline{R}||$.

5. The rate multiplier of claim 1, wherein the multiplier comprises a multiplexer latch between the multiplexer and the accumulator.

6. The rate multiplier of claim 1, wherein the multiplier comprises a MSB latch for latching the MSB of the accumulator output.

7. A method employing an accumulator and a clock switch, for rate multiplying an input pulse train to an output pulse train of a lower average pulse rate by selecting one of a first and second non-overlapping input clocks, the method comprising the steps of:

providing an output of the accumulator of a determined state; and setting the clock switch to
keep selecting the actual selected clock when the accumulator clocked by the input pulse train has its output in a first state, and
selecting the other non-overlapping clock to define the generated system clock when the accumulator has its output in a second state, wherein the output state of the accumulator is determined by signals received from a multiplexer controlled by the output of the accumulator.

8. The method of claim 7, wherein the input pulse train is selected and unselected during a low phase.

* * * * *